United States Patent [19]

St. John et al.

[11] Patent Number: 5,013,456

[45] Date of Patent: May 7, 1991

[54] DIALLYLDIMETHYL AMMONIUM CHLORIDE POLYMERS WITH ANIONIC MONOMERS FOR COAGULATING DEINKING PROCESS WATERS

[75] Inventors: Michael R. St. John, Chicago, Ill.; Ronnie L. Alexander, Mt. Laurel, N.J.

[73] Assignee: Nalco Chemical Company, Naperville, Ill.

[21] Appl. No.: 508,434

[22] Filed: Apr. 13, 1990

[51] Int. Cl.⁵ .............................................. C02F 1/56
[52] U.S. Cl. .................................. 210/734; 210/732; 210/735; 210/928; 162/5
[58] Field of Search ............... 210/732, 733, 734, 735, 210/928; 162/DIG. 4, 199, 5

[56] References Cited

U.S. PATENT DOCUMENTS 3,461,163  8/1969  Boothe .............................. 210/734
4,715,962 12/1987  Bhattacharyya et al. .......... 210/734
4,835,206  5/1989  Farrar et al. ....................... 524/457

Primary Examiner—Peter Hruskoci
Assistant Examiner—Krisanne Shideler
Attorney, Agent, or Firm—Robert A. Miller; John G. Premo

[57] ABSTRACT

Co-polymers of diallyldimethyl ammonium chloride with up to 30 mole percent of a water soluble anionic monomer such as acrylic acid are superior coagulants for deinking process waters.

5 Claims, 2 Drawing Sheets

DIALLYLDIMETHYL AMMONIUM CHLORIDE POLYMERS WITH ANIONIC MONOMERS FOR COAGULATING DEINKING PROCESS WATERS

INTRODUCTION

Recycled paper is increasingly used as a pulp source. One of the major pulping steps involves removal of the ink from any source of printed recycled paper. The washings generated from this deinking process require clean-up which is accomplished using some sort of solids/liquid separation unit operation. Dissolved air flotation (DAF) is commonly used. Recycle mills are most frequently located in the metropolitan areas where an emphasis on closing the water cycle of the mill is great. Consequently, effective clean-up of the deinking wash waters becomes important because reuse of the water generated, e.g., from a DAF, can lead to reduced sheet quality such as brightness. Also, if these waters are used for other purposes, minimizing the amounts of BOD/-COD and suspended solids is desirable.

It is common to coagulate the suspended solids contained in the deinking process waters by using as a coagulant a water soluble cationic polymer. One of the polymers that has met with some success is polydiallyldimethyl ammonium chloride, hereafter (DADMAC). One of the drawbacks in using this coagulant is that it is relatively expensive and the dosages necessary to effectuate good coagulation is often excessive. If it were possible to provide a more effective coagulant than DADMAC, an improved clarification of waste deinking process waters would be afforded.

PRIOR ART

U.S. Pat. No. 4,715,962 contains a pertinent disclosure with respect to the teachings of this invention. It shows the same polymers as being capable of removing color from paper mill waste waters. Color removal is shown in Column 10 of the patent and in particular Table II. This patent is also significant in the fact that it discloses polymers of the invention which have a wide range of IVs.

THE DRAWINGS

THE INVENTION

Figure 1:
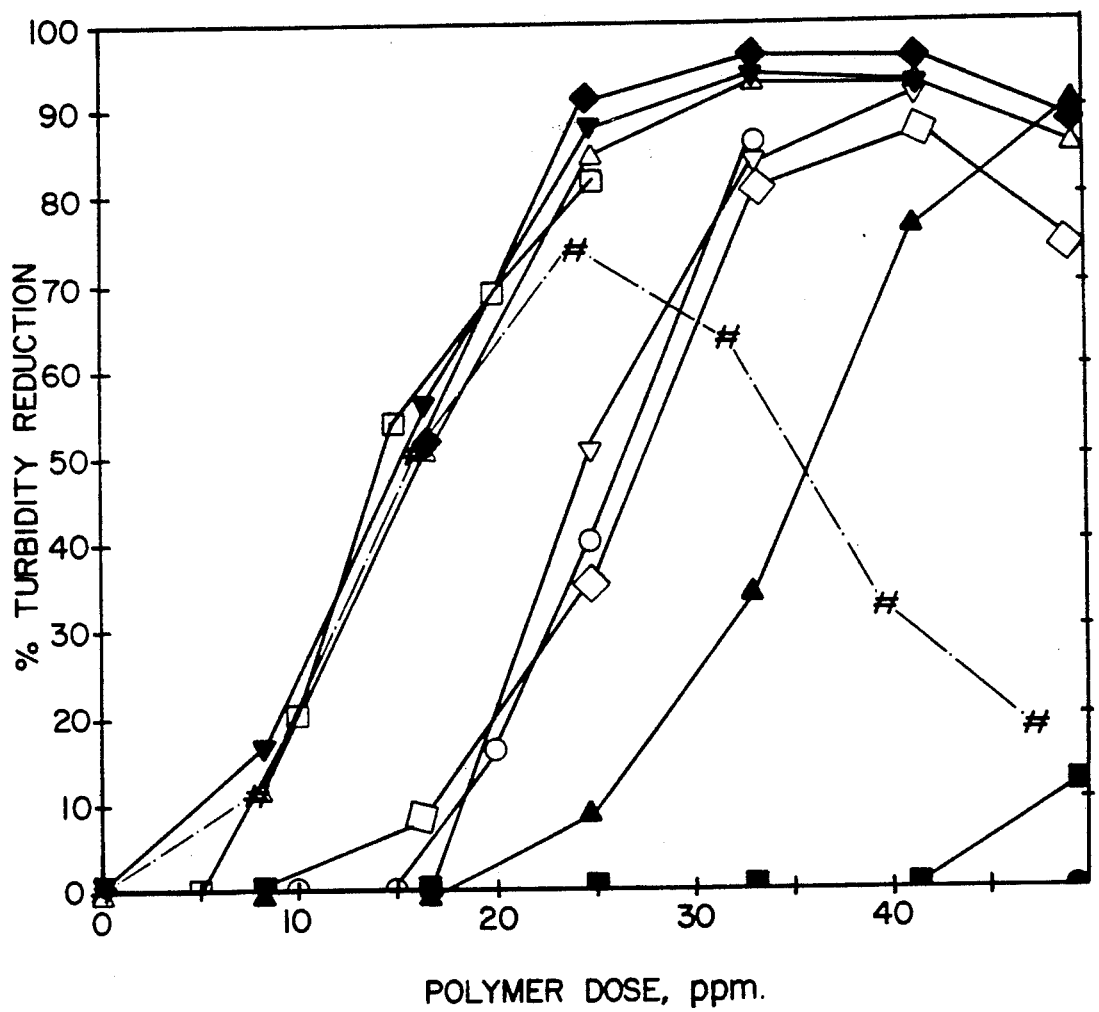
FIG. 1 illustrates the results of jar tests using a variety of coagulants on a first mill sample of deinking washings.

In its broadest aspects the invention utilizes a co-polymer of DADMAC with from between 5-30 mole percent of a water soluble anionic monomer, a co-polymer containing both cationic and anionic monomers. These co-polymers may be referred to as polyampholytes. In a preferred mode of the invention, the anionic monomer is either acrylic acid or methacrylic acid. Acrylic acid is preferred. The polymers are further characterized in that they have an Intrinsic Viscosity of at least 0.3, as measured in the 1 M $NaNO_3$ at 30° C. These polymers are used as coagulants for removing suspended solids from deinking process waters.

Another embodiment of the invention resides in adding to the DADMAC co-polymers a third nonionic diluent monomer in amounts up to about 10 mole percent.

As is in the case of the prior art, it is customary to use flocculants as a subsequent treatment of the coagulated deinking process waters to provide better solids removal. A variety of polymeric flocculants can be employed depending upon the particular deinking waste water treated. For a more detailed description of conventional polymeric flocculants see the Nalco Water Treating Handbook, second edition, 1988, McGraw-Hill, Inc., which is incorporated herein by reference. In the data reported hereafter, the coagulant used is a high molecular weight, medium charge, acrylic acid-acrylamide co-polymer. The use of these flocculants are conventional and do not form a part of this invention.

THE DADMAC CO-AND TER-POLYMERS

The DADMAC co-polymers and the DADMAC ter-polymers that are used in the invention have an Intrinsic Viscosity, hereafter IV. In a preferred embodiment the IV is between 0.3 and 0.9. Surprisingly, while polymers of the invention have IVs as high as 1.6, they are no more effective than those having an IV of 0.9.

The amount of water soluble anionic monomer polymerized with the DADMAC may vary from as little as about 5 mole percent to as much as 30 mole percent. Good results are achieved when about 10 mole percent is used.

While methacrylic and most preferably acrylic acid are preferred monomers for co-polymerization with DADMAC, other anionic vinyl monomers may be employed. Examples of such monomers are maleic acid, itaconic acid and fumaric acids.

The diluent monomers that may be ter-polymerized with the DADMAC and the water soluble anionic monomer may be used in amounts ranging up to 10 mole percent. Preferred diluent monomers are the hydroxy $C_2$-$C_6$ alkyl acrylates of methacrylates. Other diluent monomers are illustrated by the monomers, acrylonitrile, acrylamide, styrene, vinyl acetate and the like. The polymers of the invention containing the diluent monomers are attractive from the standpoint that most of the diluent monomers are inexpensive and in most cases do not materially detract from the activity of the DADMAC co-polymer into which they have been incorporated.

The co-and ter-polymers of DADMAC as generally described above are illustrated in great detail in U.S. Pat. No. 4,715,962, the disclosure of which is incorporated herein by reference. One of the teachings of this reference is that the polymers may be in the form of aqueous solutions or in the form of water-in-oil emulsions which in the presence of certain water soluble surfactants invert into water and allow the polymer contained in the emulsion to dissolve rapidly.

DOSAGE

The general dosage of the polymers is between 0.5-100 parts per million, (ppm), based on the weight of the deinking process waters. A preferred dosage range is 5-75 ppm with a most preferred range being 5-50 ppm. It is understood that routine experimentation in any particular case will be required to ascertain the optimum dosage.

EVALUATION OF THE INVENTION

| GLOSSARY |
|---|
| DAF—Dissolved Air Flotation |

-continued
GLOSSARY

BOD—Biological Oxygen Demand
COD—Chemical Oxygen Demand
HPA—Hydroxypropylacrylate
RR—Replacement Ratio
IV—Intrinsic Viscosity measured in 1 M $NaNO_3$ at 30° C.
DMA—Dimethylamine
DADMAC—Diallyldimethyl ammonium chloride
AcAm—Acrylamide
AA—Acrylic acid
RC—Water analysis on anions and cations before and after 0.45 micro meters filtration plus pH, conductivity, and turbidity
TOC—Total Organic Carbon

DEINKING WASHING SAMPLES

Deink washings from two major recycle mills were examined. Mill 1 was a paper mill located in the Eastern part of the United States. Eight gallons of the feed to the mill's DAF which contained the deink washings were shipped overnight to a test laboratory. Ten gallons of the second sample were obtained from Mill 2, located in the midwest region of the United States. Collection of untreated feed to the DAF was reported not to be possible at this mill, and a sample was synthesized from the components thought to be in the actual DAF feed. The synthesized sample was reported to be 10 volume percent deink washings and 90 volume percent water from the clear leg of a saveall. As this was not the actual DAF feed, the authenticity of the sample may be questioned. In both cases, the samples were initially subjected to analyses on arrival, stored in the refrigerator overnight, and tested for polymer activity the next day after warming to room temperature. The visual appearance of both samples was similar being a non-distinctive, gray suspension.

The samples were examined microscopically and their pH and total solids at 105 degrees C. determined. Samples were submitted to analytical for RC analyses in order to determine the ionic water chemistry of the aqueous phase. The solids were removed by filtration through a Whatman No. 54 filter prior to analysis. In order to explore the suggestion that complete treatment of the deink washings required the breaking of an oil emulsion, the organic content of the filtered samples was examined for freon extractable tests. The analysis of the deinking washings are shown in Table I.

TABLE I

| ANALYSES OF DEINK WASHINGS | | |
|---|---|---|
| PROPERTY | MILL 1 | MILL 2 |
| pH | 6.9 | 7.2 |
| Total Solids, wt % @ 105 C | 0.32 | 0.21 |
| Conductivity[a] (u mhos/cm) | 1210 | 1450 |
| Turbidity (NTU)[a] | 82 | 130 |
| Calcium (mg/l)[a] | 23 | 40 |
| Magnesium (mg/l)[a] | 6 | 11 |
| TOC (mg/l)[a] | 280 | 200 |
| Freon Extractable[a] (mg/l) | 100 | 60 |
| Freon Extractable as % of total solids | 3.1 | 2.9 |

[a]Values determined on filtrate of washings filtered through Whatman #54.

The polymeric coagulants whose activities were examined are listed in Table II. The list includes Epi/DMA and poly-DADMACs having a range of IVs as well as polyampholytes. The co-polymer Composition 6 was also examined. All polymer solutions were made up in DI water at a concentration of 0.500 weight percent polymer except Composition 6 which was prepared at 0.300 weight percent polymer. Test samples were dosed with polymer at these concentrations.

TABLE II

| TEST COAGULANT PROPERTIES | | | |
|---|---|---|---|
| PRODUCT | CHEMISTRY | IV (dl/gl) | Polymer Charge (meq/g[b]) |
| Composition 1 | EPI/DMA $NH_3$ Crosslinked | 0.180 | 6.36/5.63[a] |
| Composition 2 | EPI/DMA "Linear" | 0.102 | 7.24 |
| Composition 3 | p-DADMAC | 0.426 | 6.14 |
| Composition 4 | p-DADMAC | 0.897 | 6.51 |
| Composition 5 | p-DADMAC | 1.64 | — |
| Composition 6 | DADMAC/AcAm Co-polymer (21.4 mole % DADMAC) | 4.35 | 2.37 |
| Composition 7 | DADMAC/AA/ HPA[c] Terpolymer mole ratio 87:10:3 | 1.08 | 5.57/4.92[a] |
| Composition 8 | DADMAC/AA Co-polymer mole ratio 90:10 | 0.92 | — |

[a]Two values given for acid (pH <4.5) and alkaline (pH >8.0) conditions, acid/alkaline
[b]Theoretical charge values: DADMAC, 6.19 meq/g EPI/DMA, 7.27 meq/g
[c]HPA = hydroxypropylacrylate
[d]epichlorohydrin-dimethyl amine quaternary polymer

TESTING PROCEDURE

Activity testing was performed using conventional jar testing with a six paddle gang stirrer. Although jar testing is most suitable for settling applications, it is frequently used to screen treatments for floatation applications as well. Mill 1's screening procedure was jar testing the results of which were valid in ranking polymers for the DAF. Deink washing samples of 300 mls were used for testing. The jar test mixing and polymer addition conditions are given in Table III.

TABLE III

| JAR TEST TIMING SEQUENCE | |
|---|---|
| SEQUENCE: | 1. 2 min rapid mix (130 RPMs, max RPMs) |
| | 2. 3 min slow mix (30 RPMs) |
| | 3. 10 min settling period |
| | 4. extract supernatant sample and measure turbidity |
| POLYMER ADDITION: | 1. coagulant added at beginning of fast mix |
| | 2. flocculant added at end of rapid mix, last 40 secs. |

Polymer activity was evaluated by graphing percent turbidity reduction as a function of polymer dose. Replacement ratios were then calculated using software which calculates a polymer dose for a given performance level by interpolating between two data points using a straight line. Assuming that the necessary performance was attainable by the polymer, relative polymer performance were based on their efficiency, i.e., amount of polymer to attain the performance level. A turbidity reduction of at least 70% is essential with greater than 80% preferred.

RESULTS AND DISCUSSION

The results of the jar testing in Mill 1's deink washings are presented in FIG. 1 and Table IV. Clearly, Composition 7 exhibits exhibit the greatest efficiency among the polymers examined. In particular, the presence of the 10 mole percent AA in the polymer generated a significant efficiency improvement over homopolymer DADMAC. The homopolymer DADMACs can easily generate the desired performance although the doses required are higher. The lower molecular weight DADMAC, Composition 3, was much less efficient than the higher molecular weight product, Composition 4. However, increasing the molecular weight further with Composition 5 did not lead to increased efficiency. This observation seems strange, but the activity could conceivably plateau above a certain molecular weight. Comparison of the Composition 7 efficiency with a DADMAC Composition 5 with a considerably higher IV than Composition 7, eliminates the possibility that Composition 7 is just a higher molecular weight DADMAC than Composition 4.

Epi/DMA polymers are seen to be totally ineffective over this dosage range and were incapable of generating any reduction in turbidity. Composition 8 performed the same as Composition 7 in this application. Composition 6 exhibited unusual behavior. It initially showed activity as great as Composition 7 at low performance levels but exhibited overdosing behavior before acceptable turbidity reductions could be reached. In general, large fast settling flocs could be generated with all coagulants, even the Cpi/DMAs. However, as can be seen by the data, not all were capable of affecting the turbidity.

Figure 2:
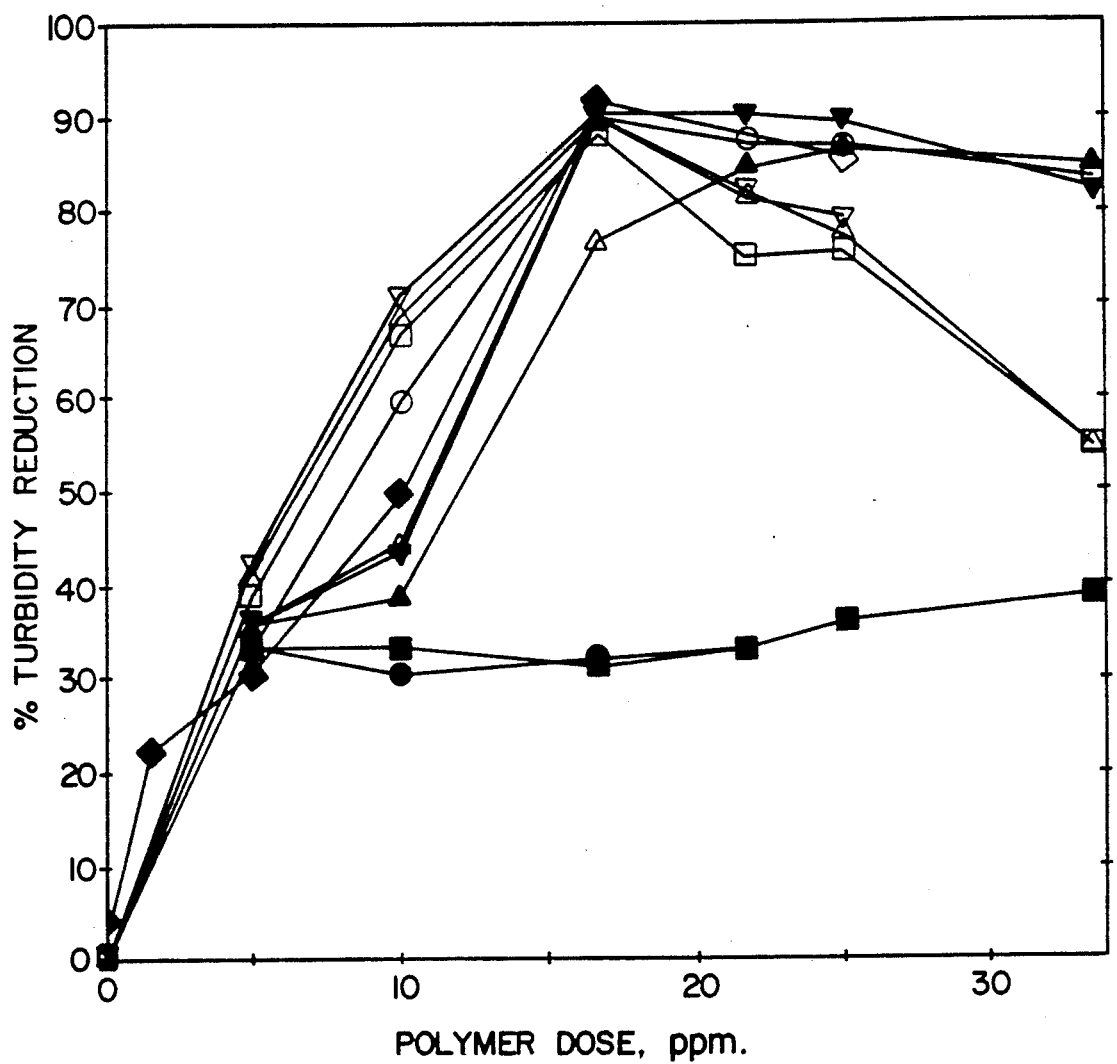
FIG. 2 is the same as FIG. 1 except another mill deinking washings were used.

Dosage curves of turbidity reduction for the Mill 2 deink washings are shown in FIG. 2, and replacement ratios based on polymer are given in Table V. Although the polyampholytes performed well, they did not exhibit the very large efficiency increases relative to homopolymer DADMAC which were observed in Mill 1 deink washings. In the 80 to 90% turbidity reduction range, the polyampholyte performed essentially the same as the higher IV DADMACs. Although this difference was observed, a number of similarities in the treatment of the two deink washings were also observed. First, lower IV DADMAC, Composition 3, performed much more poorly than the higher IV Composition 4, but again increasing the IV further Composition 5 did not yield further efficiency improvement. Second, removal of the HPA from the polyampholyte had not effect as observed before. Third, the Epi/DMA polymers were again found to be almost useless in this waste. Clearly, DADMAC chemistry is essential for activity in these deinking wastes. Both mill samples contained oil.

In all of the above tests the samples were treated with the anionic flocculant previously described. This anionic flocculant is the same flocculant referred to in Tables IV and V.

TABLE IV

REPLACEMENT RATIOS (RR) OF SELECTED POLYMERS VS. COMPOSITION 7 FROM JAR TEST RESULTS IN MILL 1 DEINKING WASH WATERS SAMPLES PRETREATED WITH 3.3 PPM OF AN ANIONIC FLOCCULANT

| PERFORMANCE LEVEL & REDUCTION | COMP. 7 | COMP. 4 | COMP. 7 | COMP. 4 | COMP. 5 | COMP. 2 | COMP. 1 | COMP. 3 |
|---|---|---|---|---|---|---|---|---|
| 50 | 0.80 | 1.65 | 1 | 1.54 | 1.69 | NA | NA | 2.23 |
| 70 | 0.96 | 1.43 | 1 | 1.41 | 1.47 | NA | NA | 1.89 |
| 80 | 1.02 | 1.35 | 1 | 1.36 | 1.39 | NA | NA | 1.83 |
| 90 | NA | NA | 1 | 1.33 | NA | NA | NA | 1.67 |
| 95 | NA | NA | NA | NA | NA | NA | NA | NA |

| PERFORMANCE LEVEL & T REDUCTION | COMP. 7 | COMP. 8 | COMP. 7 | COMP. 6 |
|---|---|---|---|---|
| 50 | 0.96 | 1.00 | 0.94 | 0.98 |
| 70 | 0.96 | 0.97 | 0.94 | 1.04 |
| 80 | 0.97 | 0.95 | 0.94 | 1.06 |
| 90 | 0.94 | 0.84 | 0.84 | NA |
| 95 | NA | 1.00 | 1.01 | NA |

*NA = Performance level is not attainable at any dose.

TABLE V

REPLACEMENT RATIOS (RR) OF SELECTED POLYMERS JAR TESTED IN MILL 2 DEINKING WASTE WATERS PRETREATED WITH 5 PPM OF AN ANIONIC FLOCCULANT

| PERFORMANCE LEVEL % T REDUCTION | COMP. 8 | COMP. 4 | COMP. 7 | COMP. 8 | COMP. 5 | COMP. 1 | COMP. 2 | COMP. 3 | COMP. 4 | COMP. 5 |
|---|---|---|---|---|---|---|---|---|---|---|
| 50 | 1.07 | 1.25 | 1 | 0.98 | 1.64 | NA | NA | 1.82 | 1.67 | 1.54 |
| 65 | 1.03 | 1.20 | 1 | 0.96 | 1.38 | NA | NA | 1.56 | 1.40 | 1.33 |
| 70 | 1.05 | 1.18 | 1 | 0.94 | 1.30 | NA | NA | 1.47 | 1.32 | 1.26 |
| 80 | 1.05 | 1.07 | 1 | 0.97 | 1.11 | NA | NA | 1.38 | 1.13 | 1.09 |
| 85 | 1.04 | 1.04 | 1 | 0.98 | 1.04 | NA | NA | 1.49 | 1.06 | 1.03 |
| 90 | NA | NA | 1 | 0.99 | 0.99 | NA | NA | NA | 1.30 | 0.98 |

*NA = Performance level is not attainable at any dose.

We claim:

1. A process of the type wherein a water soluble polymer is used to coagulate suspended solids from deinking process waters which results from the processing of recycled paper, the improvement which comprises using as the coagulant a polydiallyl dimethyl ammonium chloride polymer which contains from between 5–30 mole percent of a water soluble anionic monomer and has an Intrinsic Viscosity of at least 0.3 said polymer being added to the deinking process waters in an amount sufficient to cause coagulation of the suspended solids.

2. The process of claim 1 where the anionic monomer is acrylic acid.

3. The process of claim 2 where the polydiallyldimethyl polymer contains up to 10 mole percent of non-ionic monomer.

4. The process of claim 3 wherein the non-ionic monomer is hydroxypropyl acrylate.

5. The process of claim 2 where the acrylic acid is present in the polymer in the amount of 10 mole percent.

* * * * *